(12) United States Patent
Block et al.

(10) Patent No.: US 9,786,032 B2
(45) Date of Patent: Oct. 10, 2017

(54) SYSTEM FOR PARAMETRIC GENERATION OF CUSTOM SCALABLE ANIMATED CHARACTERS ON THE WEB

(71) Applicant: GOOGLE INC., Mountain View, CA (US)

(72) Inventors: Asa Jonas Ivry Block, Mountain View, CA (US); Suzanne Chambers, Mountain View, CA (US); George Michael Brower, Mountain View, CA (US); Igor Clark, Mountain View, CA (US); Richard The, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 250 days.

(21) Appl. No.: 14/811,256

(22) Filed: Jul. 28, 2015

(65) Prior Publication Data

US 2017/0032492 A1 Feb. 2, 2017

(51) Int. Cl.
*G06T 13/00* (2011.01)
*G06T 3/40* (2006.01)
(Continued)

(52) U.S. Cl.
CPC .............. *G06T 3/40* (2013.01); *G06F 3/0481* (2013.01); *G06T 13/40* (2013.01); *G06T 13/80* (2013.01);
(Continued)

(58) Field of Classification Search
None
See application file for complete search history.

(56) References Cited

U.S. PATENT DOCUMENTS

| 6,690,376 | B1 | 2/2004 | Saito et al. | |
| 8,692,831 | B2 * | 4/2014 | Yoon | G06T 13/40 345/473 |

(Continued)

OTHER PUBLICATIONS

Anonymous, Online Mii Editor for Nintendo Wii—Hongkiat, Apr. 14, 2015.

(Continued)

*Primary Examiner* — Ryan R Yang
(74) *Attorney, Agent, or Firm* — Procopio, Cory, Hargreaves & Savitch LLP

(57) ABSTRACT

A graphic character object temporary storage stores parameters of a character and associated default values in a hierarchical data structure and one or more animation object data represented in a hierarchical data structure, the one or more animation object data having an associated animation, the graphic character object temporary storage and the animation object data being part of a local memory of a computer system. A method includes receiving a vector graphic object having character part objects which are represented as geometric shapes, displaying a two dimensional character, changing the scale of a part of the displayed two dimensional character, and storing an adjusted parameter in the graphic character object temporary storage as a percentage change from the default value, displaying a customized two dimensional character, applying keyframe data in an associated animation object data to the character parts objects, and displaying an animation according to the keyframe data.

13 Claims, 19 Drawing Sheets

(51) Int. Cl.
*G06T 13/40* (2011.01)
*G06T 19/20* (2011.01)
*G06F 3/0481* (2013.01)
*G06T 13/80* (2011.01)

(52) U.S. Cl.
CPC .......... *G06T 19/20* (2013.01); *G06T 2213/04* (2013.01); *G06T 2219/2016* (2013.01); *G09G 2340/04* (2013.01)

(56) References Cited

U.S. PATENT DOCUMENTS

| | | | |
|---|---|---|---|
| 2004/0039934 A1* | 2/2004 | Land | G11B 27/34 726/26 |
| 2007/0115289 A1 | 5/2007 | Goldfarb | |
| 2010/0283787 A1* | 11/2010 | Hamedi | G06T 17/005 345/473 |
| 2013/0222433 A1 | 8/2013 | Chapman et al. | |
| 2014/0160116 A1 | 6/2014 | de Aguiar et al. | |
| 2014/0223271 A1 | 8/2014 | Racklyeft | |
| 2014/0267425 A1 | 9/2014 | Moll et al. | |
| 2015/0040074 A1* | 2/2015 | Hofmann | G06T 19/006 715/852 |
| 2015/0054834 A1* | 2/2015 | Marsh | G06T 13/00 345/473 |

OTHER PUBLICATIONS

International Search Report & Written Opinion, dated Oct. 17, 2016, in related application No. PCT/US2016/041222.

* cited by examiner

FIG. 4

```
// Character Object
{
"arms": {                        ⟵ 501
    "x": value,
    "y": value
    },
"legs": {                        ⟵ 503
    "x": value,
    "y": value
    },
"head": {                        ⟵ 505
    "x": value,
    "y": value
    },
"body": {                        ⟵ 507
    "x": value,
    "y": value
    },
"clothes": {                     ⟵ 509
    "shoes": "0000none",
    "hair": "0000none",
    "glasses": "000none",
    "beard": "000none",
    "pants": "0000none",
    "shirt": "007black",
    "body": false,
    "face": false,
    "head": false,
    "arm": "007black"
    },
"skinColor": 7914839,
"hairColor": 0,
"team": "pistons"
}
```

```
// Animation Object                    ← 600
{                                        ← 601
    "duration": value,                   ← 603
    "posterFrame": value, // Layer property keyframe values.
    "layername-propertyname":{           ← 605
        "initialValue": [540,0,0]        ← 607
        "startFrame": integer value,     ← 609
        "duration": integer value,       ← 611
        "frames":[[0, 0, 0],[0, -2.91, 0],[0, -9.86, 0],[0, -18.14, 0],[0, -   ← 613
25.09, 0],[0, -28, 0],[0, -27.17, 0],[0, -25.17, 0],[0, -22.82, 0],[0, -20.84, 0],[0, -
20, 0],[0, -20, 0],[0, -20, 0],[0, -20, 0],[0, -20, 0],[0, -20, 0],[0, -20, 0],[0, -20,
0],[0, -20, 0],[0, -20, 0],[0, -20, 0],[0, -20, 0],[0, -20, 0],[0, -20, 0],[0, -19.31,
0],[0, -17.48, 0],[0, -14.81, 0],[0, -11.66, 0],[0, -8.34, 0],[0, -5.19, 0],[0, -2.52,
0],[0, -0.69, 0],[0, 0, 0]]
    }
}
```

FIG. 16
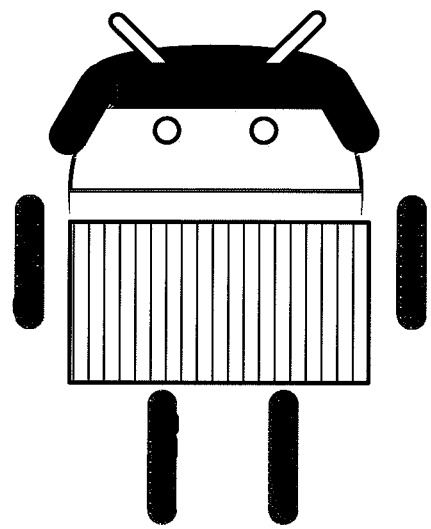
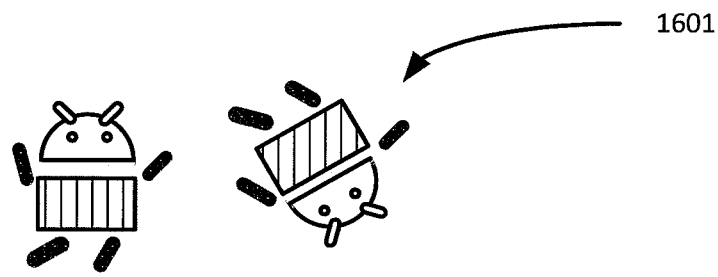
1601

FIG. 19

```
{
  "duration":80,
  "posterFrame":23
  // Layer property keyframe values.
  "master-position":{
    "initialValue":[960, 540, 0],
    "startFrame":11,
    "duration":43,
    "frames":[[0, 0, 0],[0, -2.91, 0],[0, -9.86, 0],[0, -18.14, 0],[0, -25.09, 0],[0, -28, 0],[0, -27.17, 0],[0, -25.17, 0],[0, -22.82, 0],[0, -20.84, 0],[0, -20, 0],[0, -20, 0],[0, -20, 0],[0, -20, 0],[0, -20, 0],[0, -20, 0],[0, -20, 0],[0, -20, 0],[0, -20, 0],[0, -20, 0],[0, -20, 0],[0, -20, 0],[0, -19.31, 0],[0, -17.48, 0],[0, -14.84, 0],[0, -11.66, 0],[0, -8.34, 0],[0, -5.19, 0],[0, -2.52, 0],[0, -0.69, 0],[0, 0, 0]]
  },
  "armRight-rotation":{
    "initialValue":[0.5236],
    "startFrame":0,
    "duration":79,
    "frames":[[0.5236],[0.5236],[0.5236],[0.5236],[0.5236],[0.5236],[0.5089],[0.4629],[0.3831],[0.2675],[0.1151],[-0.0736],[-0.2954],[-0.5444],[-0.8116],[-1.0864],[-1.3577],[-1.6157],[-1.8529],[-2.0644],[-2.2478],[-2.4025],[-2.529],[-2.6286],[-2.7029],[-2.7538],[-2.7831],[-2.7925],[-2.7903],[-2.7831],[-2.7705],[-2.7516],[-2.7256],[-2.6916],[-2.6481],[-2.5936],[-2.5261],[-2.4432],[-2.342],[-2.219],[-2.0707],[-1.8941],[-1.6893],[-1.4622],[-1.2254],[-0.9946],[-0.7818],[-0.5926],[-0.4275],[-0.2846],[-0.161],[-0.0542],[0.0383],[0.1186],[0.1884],[0.2489],[0.3014],[0.3469],[0.386],[0.4195],[0.448],[0.47],[0.4917],[0.5077],[0.5203],[0.5297],[0.5365],[0.5398],[0.5411],[0.5407],[0.5393],[0.5371],[0.5338],[0.5305],[0.5278],[0.5258],[0.5245],[0.5238],[0.5236],[0.5236]]
  },
  "armLeft-rotation":{
    "initialValue":[2.618],
    "startFrame":0,
    "duration":79,
    "frames":[[2.618],[2.618],[2.618],[2.6111],[2.5896],[2.5537],[2.5031],[2.438],[2.3594],[2.2684],[2.167],[2.0576],[1.9431],[1.8269],[1.7124],[1.6029],[1.5015],[1.4105],[1.3319],[1.2669],[1.2162],[1.1803],[1.1589],[1.1519],[1.1532],[1.1574],[1.1648],[1.1757],[1.1906],[1.12102],[1.235],[1.2659],[1.3038],[1.3497],[1.4047],[1.4701],[1.5465],[1.6341],[1.7312],[1.8344],[1.9387],[2.039],[2.1315],[2.2142],[2.2869],[2.3499],[2.4042],[2.4508],[2.4906],[2.5244],[2.5532],[2.577],[2.597],[2.6132],[2.6263],[2.6364],[2.6439],[2.649],[2.652],[2.6529],[2.6524],[2.6506],[2.6473],[2.6427],[2.6373],[2.6318],[2.6271],[2.6235],[2.6209],[2.6192],[2.6183],[2.618],[2.618],[2.618],[2.618],[2.618],[2.618],[2.618],[2.618]]
  },
  ...
}
```

SYSTEM FOR PARAMETRIC GENERATION OF CUSTOM SCALABLE ANIMATED CHARACTERS ON THE WEB

BACKGROUND

1. Technical Field

The subject matter described herein generally relates to the field of character animation and in particular to a system and method that enables customization and animation of characters.

2. Background Information

Conventionally, character animation has been used in video games. Character animation in video games typically uses a fixed model and standardized characters. Conventionally, assets, which include elements that are not part of a core body, are created for a limited number of character types. Conventionally, animation of characters is performed as a series of bitmap images that are used to convey motion. Conventional bitmap images are difficult to scale without distortion and without impairing smooth animation.

Vector graphics has evolved as an alternative to bitmap images. Vector graphics may be scaled proportionally. However, scaling vector graphics at an arbitrary ratio creates unattractive visual artifacts, such as squashing, skewing and stretching.

There is presently no system for adding animation to custom generated, two-dimensional web based and arbitrarily sized characters.

Graphics processing is a limited resource on mobile devices. To dynamically generate custom characters, assets and animations, one needs substantial graphics processing power, which is often not available on mobile devices.

Bandwidth is a limited resource on mobile devices. As animations are typically delivered as a sequence of bitmap images, there is no simple way to animate an infinite number of characters with set animations as a pre-rendered asset.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to systems and methods for parametric generation of custom scalable animated characters on the Web.

Customization may include adding assets to characters and changing the size (adjusting scale) of the character and assets. Assets may include elements that are not part of a core body, such as mustache, hair, beard, freckles, tattoos, clothing items, or other accessories. In some aspects, scaling may be arbitrary and there are potentially a large number of possible asset permutations. Aspects of the invention also simplify effort in creating two dimensional characters and aspects by illustrators by alleviating the need to create character, clothing and accessory images for various scales. Aspects of the invention simplify effort in creation of customized two dimensional characters that are scalable and animation of the customized characters of arbitrary scale. Aspects of the invention enable any number of animations to be specified in data objects that are applicable to customized characters of arbitrary scale.

Aspects of the invention include implementation as an Internet application or a self-contained app. Aspects of the invention enable minimization of bandwidth requirements for data transfer, as well as minimal memory usage.

Aspects of the invention provide an entertainment environment as well as a development environment in creation of custom scalable animated characters, as well as creation of characters for inclusion in applications, such as in education and gaming systems.

An aspect of the invention is a system comprising one or more data processing devices; the one or more data processing devices including a local memory configured to store a character hierarchical data structure for maintaining parameter values associated with geometric shapes for a vector graphic character, the vector graphic character having a plurality of character part objects represented as the geometric shapes; the one or more data processing devices configured to perform a character scaling section that, upon receiving a command to change a scale of one or more of the character part objects of the two dimensional character displayed in an interaction display area of a display device, executes vector graphic scaling functions to arbitrarily change scale of the character part object based on the parameters, stores updated proportions as values of the parameters relative to default dimensions of the character part objects in the character hierarchical data structure, and displays in the interaction display area of the display device a scaled two dimensional character in accordance with the updated proportions; the one or more data processing devices configured to retrieve one or more animation templates from an animation memory, and apply the animation templates to a basic graphic character having default dimensions in order to display one or more different types of animations of the basic graphic character; the one or more data processing devices configured to perform an animation section that upon selection of one of the animation templates, applies the selected animation template to the scaled vector graphic character; and display in the display device an animation of the scaled two dimensional character based on the selected animation template.

In a further aspect of the invention, the one or more data processing devices are configured to perform a character scaling section that, upon receiving a further command to change a scale of a two dimensional character displayed in an interaction display area of a display device, executes vector graphic scaling functions to further arbitrarily change scale of one or more of the character part objects of the vector graphic character, stores further updated proportions relative to default dimensions of the character part objects in the character hierarchical data structure, and displays in the interaction display area of the display device a revised scaled two dimensional character in accordance with the further updated proportions;

In a further aspect of the invention, the system includes a graphical user interface including: the display displaying one or more assets retrieved from an asset memory storing vector graphics of assets, the one or more data processing devices configured to perform an asset displaying section that upon selection of a graphic asset, renders the selected graphic asset superimposed as a layer over a corresponding character part object as a layer of the vector graphic character to display the two dimensional character and superimposed asset in the interaction display area, and the one or more data processing devices configured to perform an asset scaling section that upon receiving a command to scale one or more of the character part objects of the graphic character displayed in the interaction display area, changes the scale of the graphic asset in accordance with the scale of a respective character part object.

In a further aspect of the invention, the one or more vector graphic assets include clothing, accessories, or additional body features.

In a further aspect of the invention, the system includes a graphic character memory, wherein the graphical user interface further includes a save function, which upon execution of the save function stores the contents of the character hierarchical data structure into a nonvolatile memory.

In a further aspect of the invention, the one or more data processing devices configured to perform a reception section for submission of vector graphic characters and graphic assets for storage to a graphic character storage or a graphic asset storage, respectively.

In a further aspect of the invention, the system includes an Internet browser application, wherein the Internet browser application functions are performed by executing scripting language commands, and the vector graphic characters, the character hierarchical data structure, and the animation templates are hierarchical data objects that are downloaded from an Internet server.

In a further aspect of the invention, the system includes an animation application processor, which executes scripting language commands of an animation application, and the vector graphic characters, the character hierarchical data structure, and the animation templates are hierarchical data objects that are downloaded from a server.

In a further aspect of the invention, the one or more data processing devices configured to perform the animation section, which upon selection of another one of the animation templates, applies the another selected animation template to the scaled vector graphic character in place of the previously selected animation template; and display in the display device an animation of the scaled two dimensional character based on the another selected animation template.

An aspect of the invention is a method in a computer system, the computer system including a graphic character object temporary storage that stores parameters of the character and associated default values in a hierarchical data structure and one or more animation object data represented in a hierarchical data structure, the one or more animation object data having an associated display character animation, the graphic character object temporary storage and the animation object data being part of a local memory of the computer system, the method comprising: receiving a two dimensional character vector graphic object, the vector graphic object having character part objects which are represented as geometric shapes; rendering the two dimensional character vector object as a displayable image and displaying the image as a two dimensional character; accepting an input to change the scale of a part of the displayed two dimensional character, and converting the displayed scaled part into adjusted parameter values of the corresponding geometric shape; storing the adjusted parameter in the graphic character object temporary storage as a percentage change from the default value; displaying the two dimensional character with the scaled part as a customized two dimensional character; displaying the one or more display character animations; for one the display character animation, applying keyframe data in the associated animation object data to the character parts objects; displaying the customized two dimensional character as an animation according to the keyframe data.

In a further aspect of the invention, the computer system includes one or more two dimensional asset vector graphic objects for associated character parts objects, the method further including rendering the one or more two dimensional vector graphic objects as one or more images of the assets, and displaying the asset image as a layer for a respective character part, accepting a drag operation to change scale of the one or more asset images, and converting the displayed scaled asset into adjusted parameter values of the corresponding geometric shape to display as a customized two dimensional character; and storing the adjusted parameter in the graphic character object temporary storage as a percentage change from the default value.

In a further aspect of the invention, character parts objects include a joint and the keyframe data includes a sequence of joint rotation angles.

In a further aspect of the invention, the method includes interacting with the customized two dimensional character having the displayed asset image and replacing the asset image with a new asset image for a respective character part, and displaying the customized two dimensional character with the replaced asset.

Further scope of applicability of the methods and systems of the present disclosure will become apparent from the Detailed Description given below. However, it should be understood that the Detailed Description and specific examples, while indicating embodiments of the methods and systems, are given by way of illustration only, since various changes and modifications within the spirit and scope of the concepts disclosed herein will become apparent to those skilled in the art from this Detailed Description.

These and other aspects are described with respect to the drawings. The teachings of the disclosed application can be readily understood by considering the following detailed description in conjunction with the accompanying drawings.

BRIEF DESCRIPTION OF THE DRAWINGS

FIG. 4 is an example format for a JSON object for a character according to aspects of the invention;

FIG. 5 is an example format for a JSON object for an animation according to aspects of the invention;

FIG. 16 is a screen showing an example of a customized character displayed together with a set of available animation types according to aspects of the invention;

FIG. 19 shows example animation specification data for an animation object according to aspects of the invention.

Figure 1:
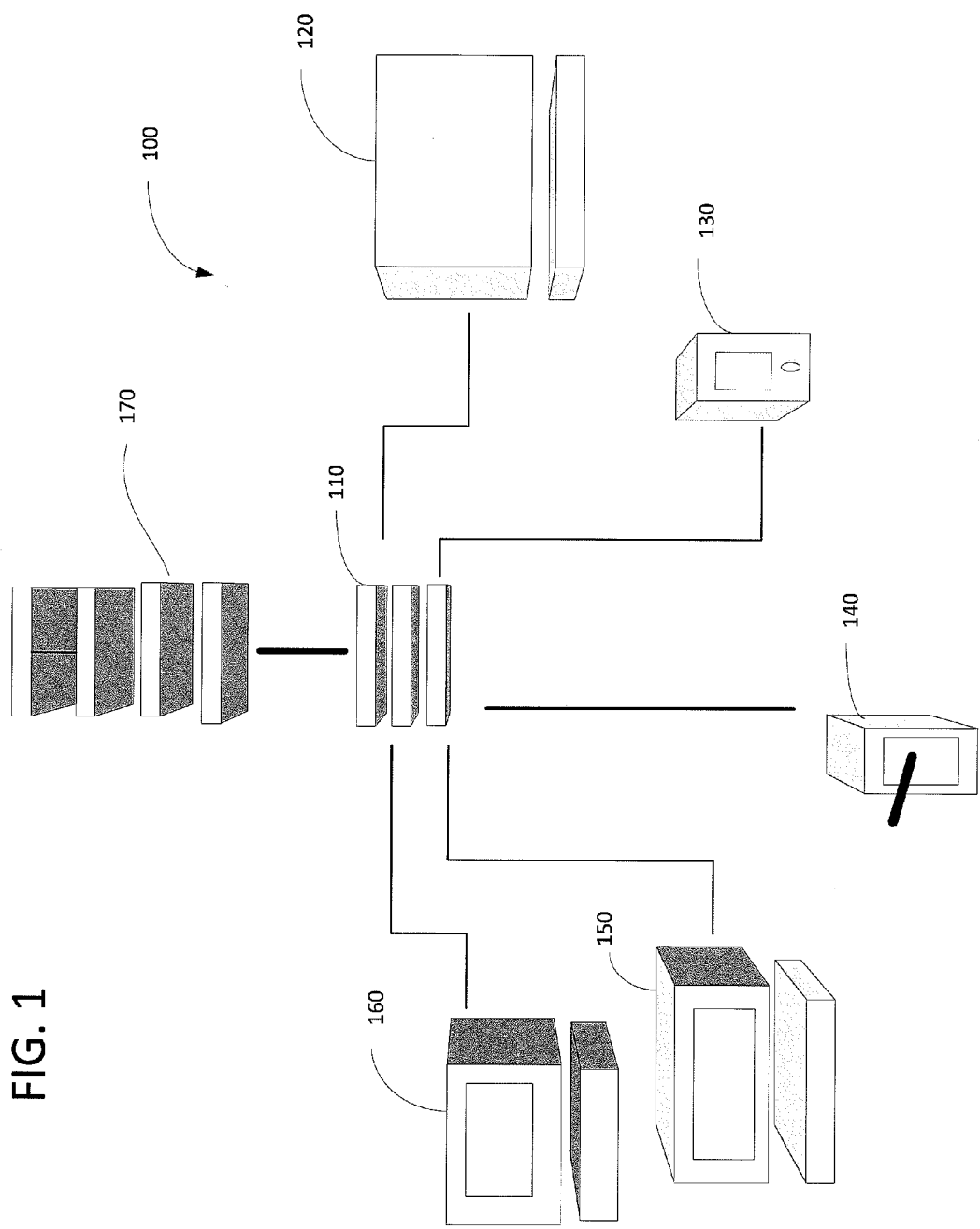
FIG. 1 is a diagram of a system environment according to aspects of the invention.

The figures depict embodiments of the disclosed invention for purposes of illustration only. One skilled in the art will recognize from the following discussion that alternative embodiments of the structures and methods illustrated herein may be employed without departing from the principles of the invention described herein.

DETAILED DESCRIPTION

The following description refers to the accompanying drawings. The following description is not intended to limit the scope. Instead, the scope is defined by the appended claims.

<Acronyms>
SVG—Scalable Vector Graphics.
JSON—JavaScript Object Notation
XML—eXtensible Markup Language
<System Environment>

Aspects of the present invention apply assets and animation to a two-dimensional character on the web that has arbitrary geometry, in an environment that provides infinite possibilities for character proportions and a large number (>1.4 quadrillion) of character asset permutations.

An aspect of the invention is creation and animation of custom scalable characters with assets that is suited for use by a large number of users of a computer network, such as the Internet. Illustrators and artists may create basic two dimensional characters and assets to be used in customizing the basic characters. An aspect of the invention is two dimensional characters and assets that are vector graphic objects. In an example embodiment the characters and assets may be vector graphic objects in accordance with Scalable Vector Graphics constructs. Scalable Vector Graphics define display images in terms of geometrical features, as opposed to bitmap image data. Although Scalable Vector Graphics requires additional processing to create an image from geometrical features, the additional processing can include scaling. As such, users may create custom scalable animated characters using characters and assets provided by the illustrators and artists.

Computer networks, such as the Internet, enable interconnection of various types of computing devices. An aspect of the invention is a web application that users may use to create custom scalable animated characters on the web. An aspect of the invention is an app that may be downloaded from another computer on the network to a mobile computing device.

In either case of web application or app, an aspect of the invention is a computing device that has locally stored, or has access to storage of basic two-dimensional character figures and basic two-dimensional assets. The term "basic" is used to mean a single two-dimensional character or asset that may scaled into arbitrary proportions. The term "basic" relates to an aspect that is alternative to a case where any number of character or asset images of various proportions are created for a given character or asset. In other words, an aspect of the invention is a single character or asset provided by an illustrator that may be computed to an arbitrary scale when being customized by a user, as opposed to an illustrator creating arbitrarily proportioned character figures for a given character.

FIG. 1 shows a computer network 100 having some types of computing devices that may be interconnected. However, one of ordinary skill would understand that there can be many other types of computing devices connected in a computing network. Subsequently, only for illustrative purposes, FIG. 1 shows desktop computers 150 and 160, tablet or Personal Digital Assistant (PDA) 140, smartphone 130, laptop computer 120, each of which are capable of connecting over the network through one or more server devices 110. The server devices 110 may be connected to backend processors 170, which may make up a data center.

<User Experience>

A user experience is described which presumes interaction with a display screen. Operation of the system to accomplish the user experience will be described later. A user can create an animated character of arbitrary scale by choosing among basic characters and basic assets (hair, clothing and accessories) that have been provided by illustrators and artists, and choosing an animation. Basic characters and basic assets may be represented in vector graphics.

Figure 2:
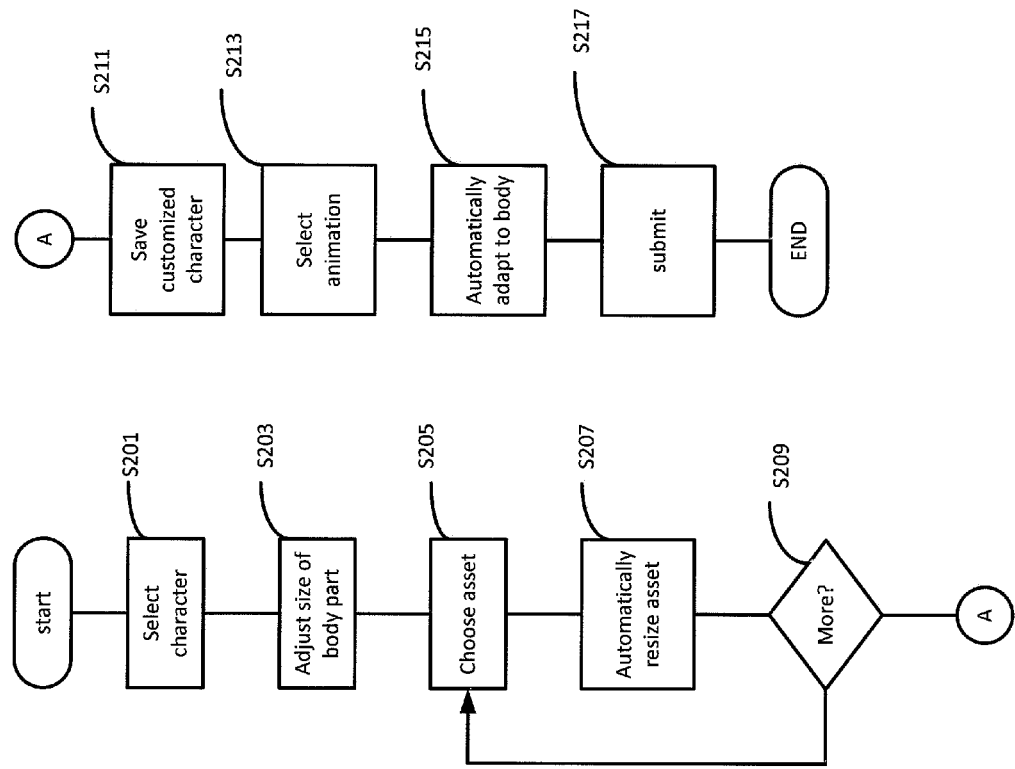
FIG. 2 is a flowchart for an example operation of a user interface according to aspects of the invention.

FIG. 2 is a flow diagram for a general user experience. It is noted that some steps are optional, as the user has much leeway in creating a customized character. For example, a user may choose not to adjust the size of a character.

Figure 3:
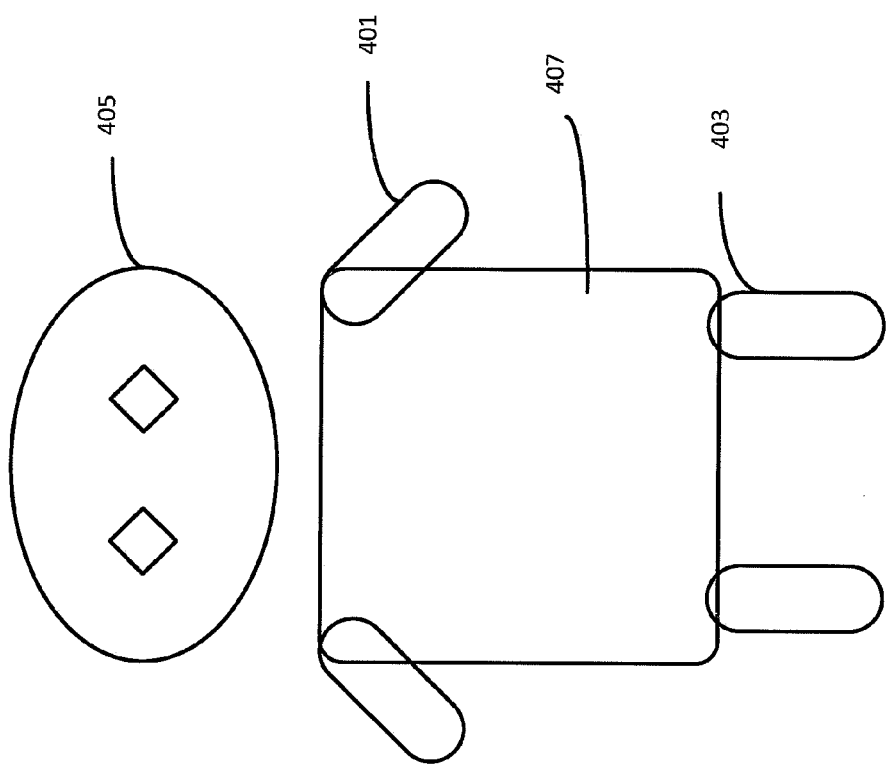
FIG. 3 shows an example displayed image for a two dimensional basic character according to aspects of the invention.

An example of a displayed image for a two dimensional character is shown in FIG. 3. An aspect of the invention is that, prior to operation by an end user, basic character objects and asset objects may be sliced into parts to be expressed as layers. Layers are a construct that enable separate processing of objects by a web browser. Also, layers are a construct that enables graphical objects to be stacked, such that objects in higher layers may be displayed, overlapping objects in lower layers. In an example embodiment, characters may be sliced into smaller objects, for example: body, head, legs, arms. The display image shown in FIG. 3 provides a display perspective of the sliced objects, including arms 401, legs 403, head 405, and body 407. The sliced objects define the extent that scaling can be applied. In other words, a user may choose to scale individual sliced objects of a character. In addition, Animation templates may then be created for any character object that includes comparable sliced objects of a two dimensional character. Specific examples of character customization and animation are discussed in later sections.

In step S201, a user may select a particular two dimensional character from a set of displayed basic two dimensional characters that are being displayed in a display device, or that may be scrolled into the display, as necessary. The selected two dimensional character may be displayed in a designated area of the display device for further interaction. In step S203, a body part, such as a leg, arm, body, head, may be selected and adjusted in scale by, for example, dragging an edge of the displayed part. In an embodiment of the invention, selection of one leg or arm, and adjustment of size of the leg or arm is reflected in the other leg or arm to the same extent. In an alternative embodiment, a limb or other part may be individually adjusted in size.

While a character is displayed in the interaction display area, various types of assets may be displayed, which may be selected for display in the interaction display area as an item of clothing or as an accessory item for the two dimensional character. In step S205, upon selection of an asset type, a set of particular assets of the type may be displayed. The user may select a particular asset of the type, and upon selection, the asset may be positioned in the interaction display area as a layer, or layers, for the displayed two dimensional character.

An alternative method of selecting an asset for a part of the character, may be to select a character part displayed in the interaction display area. Upon selecting a displayed part, for example the character's body, a set of assets that can be applied to the selected character part may be displayed. Again, the user may select a particular asset from among the set of displayed assets.

In an embodiment of the invention, in the case that a body part has an associated asset layer, or layers, if the user selects and drags a displayed asset layer to adjust size, in step S207, the displayed asset will be adjusted in size. In an alternative embodiment, all layers associated with an asset may be adjusted in a coordinated fashion to a common proportion. For example, if a displayed asset is adjusted in size by 20 percent, other layers associated with the asset may also be automatically adjusted by 20 percent. As a further alternative, an asset may be adjusted in size without affecting the size of the associated body part.

In step S209, the user may continue to add more assets to the character displayed in the interaction display area, and make size adjustments to parts of the character. In addition, the user may replace assets that are displayed on the two dimensional character with an alternative asset, or group of assets. An aspect of the invention is to select a displayed character part or select an asset in the case that the displayed character part has an existing asset layer or layers. In such case, the selection of a new asset will replace the existing asset layer or layers.

At some point, the user can choose, at step S211, to save the customized character. As an option, a user may decide to exit without saving a customized object and may start the process over and select a different character, at step S201.

A saved customized character may be animated. In an embodiment, animation templates are created in advance, and may be selected for application to the saved customized character. At step S213, a user may select an animation from among displayed animation types. An aspect of the invention is a set of animation types that are displayed with the animation motions being performed for the basic character. Thus, an animation type is an animation of a basic character. The user may select an animation type based on an animated basic character. Upon selecting an animation type, step S213, the animation is automatically applied at step S215 to the character displayed in the interaction display area. Similar to the case of assets, the user may apply alternative animation types, one at a time, in order to view the effects of the animation types on the character displayed in the interaction display area. This capability of replacing assets with alternative assets, and replacing animation types with alternative animation types can provide a source of entertainment for the user. At some point, the user may, at step S217, select to post a finished animation of the customized character to, for example, another web site, or store the animation of the customized character for later use.

<Character Object>

An aspect of the invention is a capability of arbitrarily scaling basic two dimensional characters and assets. Basic two dimensional characters and assets may be represented in the form of vector graphics. Scaling may be accomplished by adjusting parameters in vector graphic objects. For example, a head of a character may be represented in a vector graphic object as a semi-circle. In such case, the size of a displayed head can be adjusted by changing the diameter of the semicircle in the vector graphic object. In a similar manner, the arms of a character may be represented as an oval. The size of displayed arms may be adjusted by changing the length or width of the oval. In such cases, a change in size of a displayed object may be reflected by scaling other objects by the same proportion.

An aspect of the invention is maintenance of adjustable parameters of basic character parts in a hierarchical data structure, such as JSON or XML. An aspect of the invention is that when a user changes the size of a displayed character part, the adjusted size may be stored in the JSON object for the respective character part as, for example, a percentage change from the initial value of a parameter for the basic character. For example, a head object represented as a semi-circle may have a parameter of diameter. The value of the diameter parameter may be 20 percent, which means 20 percent of the diameter of the head of the basic character. By standardizing character parts and assets, any basic two dimensional character that consists of those standardized parts and assets can be scaled for a common set of parameters. In other words, the parameters stored in a JSON object can be associated with many basic characters.

Subsequently, an aspect of the invention is a character object data format represented as a JSON object that maintains scaling data for a basic character and associated assets. Also, as a two-dimensional character is re-drawn, scaling data may be updated in the JSON object.

An example character object data format represented as a JSON object is shown in FIG. 4. JSON objects specify attribute-value pairs. In the example character object data format of FIG. 4, character parts are objects, each having proportions that are relative to a basic two-dimensional character. The proportions correspond to values of a scaled basic character. The character part objects may include: arms, legs, head, body, and clothes. The arms object 501 may be used to define both arms of a character object. Alternatively, an arm object may be used to define each arm individually.

The arms object 501 may have an attribute "x" that indicates that the width of an arm is a percentage of the basic character object's arm(s) width. The arms object 501 may have an attribute "y" that indicates that the height of an arm is a percentage of the basic character object's arm(s) height.

The percentage may be a value that is less than 100%, such as 50%, and may be a value greater than 100%, such as 150%. In other words, the basic character's parts may be scaled upward or downward from the basic character part.

In a similar manner, a legs object 503 may be used for both legs of a character object. Alternatively, a leg object may be used to define each leg individually.

The legs object 503 may have an attribute "x" for a percentage of width of a basic character's leg, and an attribute "y" for a percentage of height of a basic character's leg.

Each of a head object 505 and a body object 507 may have an attribute "x" for a percentage of width and an attribute "y" for a percentage of height based on the head and body, respectively, of the associated basic character.

In the case of clothes and accessories, a clothes object 509 maintains prefixes for asset file names. In this manner an asset object is created for the associated basic object. Initially, a character object may have clothes attributes that have values that represent a blank asset. Clothes attributes may be assigned alternative values as assets are replaced with alternative assets.

Other parameters of a character object may include skin color and hair color. In addition, an optional parameter of a character object may include a theme. In an example embodiment, a theme may be a sport, a school, a popular game or movie, etc., that indicates a category of clothing and animation. As an example, a theme may be NBA basketball, in which case the character object can be customized for a particular NBA team, having team-related assets. In an example embodiment, a team may have an associated color palette for special team colors that may be used to modify color of fill areas designated as theme-modifiable.

<Animation Object>

In order to simplify creation of animations for a large number of two dimensional characters, data for specifying an animation type may be stored in a hierarchical data structure, in a similar manner as in the case of a character object. Such an approach alleviates a need to create code to animate each character.

An aspect of the invention is an animation data object that represents animation effects that are applicable to any scaled two dimensional character. In other words, an animation data object provides animation data for a two dimensional character, in which the types of data are independent of the scale of the character. Subsequently, a single animation data object is applicable to a two dimensional character of any arbitrary scale.

For example, character SVG objects may define legs as geometric elements, including a joint(s). Provided such a representation, an annotation data object can be configured to specify a rotation of a limb, such as a leg, in terms of relative positions from a joint socket and a sequence of joint rotations, thereby specifying animation types that are independent of scale. In addition, provided an animation data object that is independent of scale of a character, a large number of animation objects may be applied to a two dimensional character of arbitrary scale. Also, an aspect of the animation data object is a representation that is independent of display aspect ratio. Subsequently, the animation data object is applicable to display devices of various sizes and display resolutions.

An example format for an animation data object represented as a JSON object is shown in FIG. 5. The animation data object 600 may have a "duration" parameter 601 that specifies the length of the animation in frames. An aspect of the invention is a default frame "poster frame" 603 to be incorporated if the animation needs to be depicted in a still image.

An aspect is two dimensional characters that are vector graphics that have been sliced into parts represented as layers. For example, a character's right leg may be designated as a layer and a left leg may be designated as another layer. Each layer may be individually subject to an animation effect. An aspect of the invention is character objects, including layers that are created as vector graphics. An aspect is animation effects that can be applied to vector graphics. Layers represented in vector graphic objects may include a joint and an associated joint socket. An aspect of the invention is an animation object that specifies a sequence of joint rotations and relative positions of joint sockets.

The example format of an animation data object 600 shown in FIG. 5 enables the scale-independent aspects of animation. The format of the animation data object 600 may include a list of animation layer keyframe objects. Each layer keyframe object 605 may be designated by "layer name" and "property name." Properties are animation effects that may be applied to a layer. Properties may include "position", "rotation", and "scale".

Subsequently, examples of animation layer keyframe objects may include such layer-property pairs as:

"head" "rotation",
"right-arm" "rotation",
"left-arm" "rotation",
"body" "rotation",
"left-leg" "rotation",
"right-leg" "rotation",
"left-foot", "rotation",
"right-foot", "rotation",
"left-eye", "scale",
"right-eye", "scale",
"left-blink", "scale",
"right-blink", "scale",
"left-antenna", "rotation",
"right-antenna", "rotation".

For purposes of relative positioning, a "master" layer and "position" may be specified for an animation data object 600.

The layer names reflect layers of a two dimensional vector graphic character. Thus, choice and extent of layers and names are user-generated, and are thus, not limited to the above example names. However, provided that animation effects are scale-independent, basic characters may be created with consistent layers so that a single animation data object is applicable to any of several basic characters.

The format for animation layer keyframe objects may include an initial value 607, a start frame 609, a duration 611, and value of each keyframe 613. Keyframe values vary depending on the property. For example, a property of position may be a three dimensional value (x, y, z). A property of rotation may be represented as an array of length one, where each value may represent an angle.

The initial value 607 is a value of the property for the animation timeline's first frame. The start frame 609 is the frame at which keyframe values begin. In an example embodiment, all frames preceding the start frame may have a value of the initial value 607. The duration 611 is the length of the keyframe's timeline. In an example embodiment, the duration 611 is the frame position of the property's last keyframe, which is based on the value of start frame 609. For example, a value of duration 611 of 43 and a value of start frame 609 indicates that the property begins at keyframe 11 and continues to the property's last keyframe of 43, over a period of 33 keyframes.

The example of keyframe values shown in FIG. 5 indicates positions of the layer at each keyframe. In an example embodiment, the values of the property at each of the keyframes 613 represent values at a predefined frame rate (designated as frames per second (fps)). The frame rate for animations is set beforehand by the system that processes the animations. The frame rate may be set to any value. However, frame rates may be set to typical intervals of systems that the animations are to be executed. A typical value for frame rate is 24 fps. In such case, values of keyframes would be based on an assumption that 24 frames would be processed in one second.

<Application>

An aspect of the invention is an app that may be downloaded to any of the computing devices 120-160 connected over the network. An aspect of the invention is a Web application that may be performed using a Web browser running on any of the computing devices 120-160. In the case of a Web application, various processes may be performed locally and divided between operations performed at the server device 110, 170 and operations performed at the local device 120-160.

Figure 6:
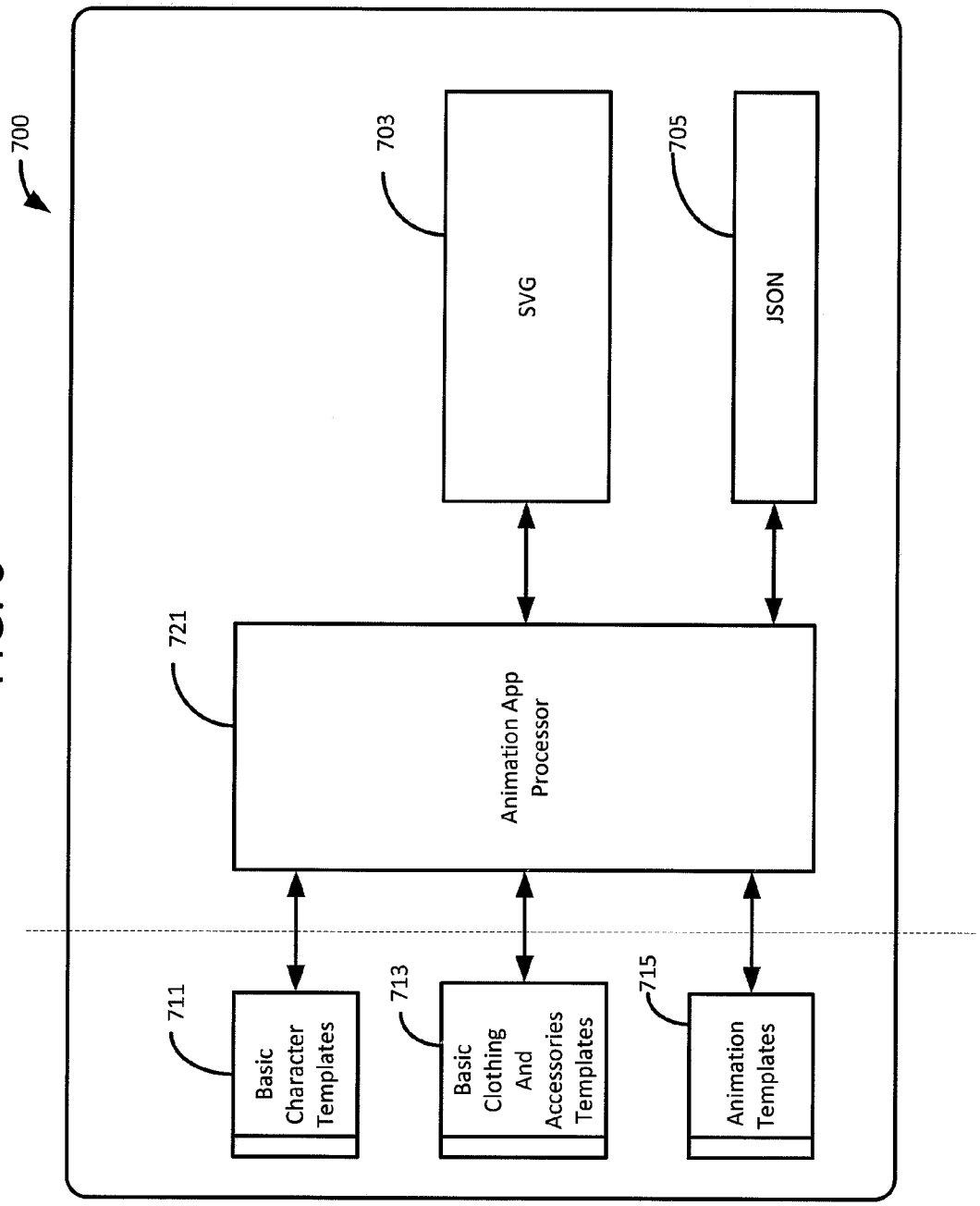
FIG. 6 is a block diagram of components in an app configuration according to aspects of the invention.

FIG. 6 is a block diagram for a configuration of a computing device 700 (for example any of 120-160) in which an app for animation creation is downloaded from the server device 110, 170. In such case, a program, such as a script, 721, controls processing that takes place during use of the app. As mentioned above, illustrators and artists may provide basic two dimensional characters and assets, which in turn may be stored in some form of storage, for example, in a data storage accessible by the server device 110, or stored in the server device 110 itself. The animation program 721 may access characters and assets from the external storage associated with the server device 110, as needed, or may download a group of basic characters and assets at the time of downloading of the app, or at a later time. In an example embodiment, basic two dimensional character vector graphic objects may be stored in a storage 711, basic asset vector graphic objects may be stored in a storage 713.

Animation data objects that are applicable to any of a variety of characters may be stored in a storage 715.

One of ordinary skill would understanding that each storage 711, 713, 715 may be volatile memory or nonvolatile memory, and could be a detachable programmable ROM or Flash memory device.

An aspect of the invention is SVG objects as graphic objects and JSON objects as data objects. A basic two dimensional character may itself be represented in one or more SVG objects. In a similar manner, a two dimensional asset may be represented in one or more SVG objects. FIG. 6 shows a configuration in which the application program 721 has access to SVG objects 701 and JSON objects 703.

An aspect of the invention is an application program 721 that includes a JavaScript library. The JavaScript library is a set of functions that are applicable to all basic two dimensional characters and animations. Parameters that may be adjusted for purposes of scaling and performing animation are maintained in the JSON objects for character objects (FIG. 4) and animation data objects (FIG. 5). The JavaScript library may include character scaling functions, asset scaling functions, animation functions and display functions. The JavaScript library may also include general graphics processing functions, such as raster conversion functions that draw images from the vector graphics and render the images for display. One of ordinary skill in the art would understanding that other computer languages may be used in the application program 721, such as Java, C, C++, Python, to name a few computer languages.

Figure 7:
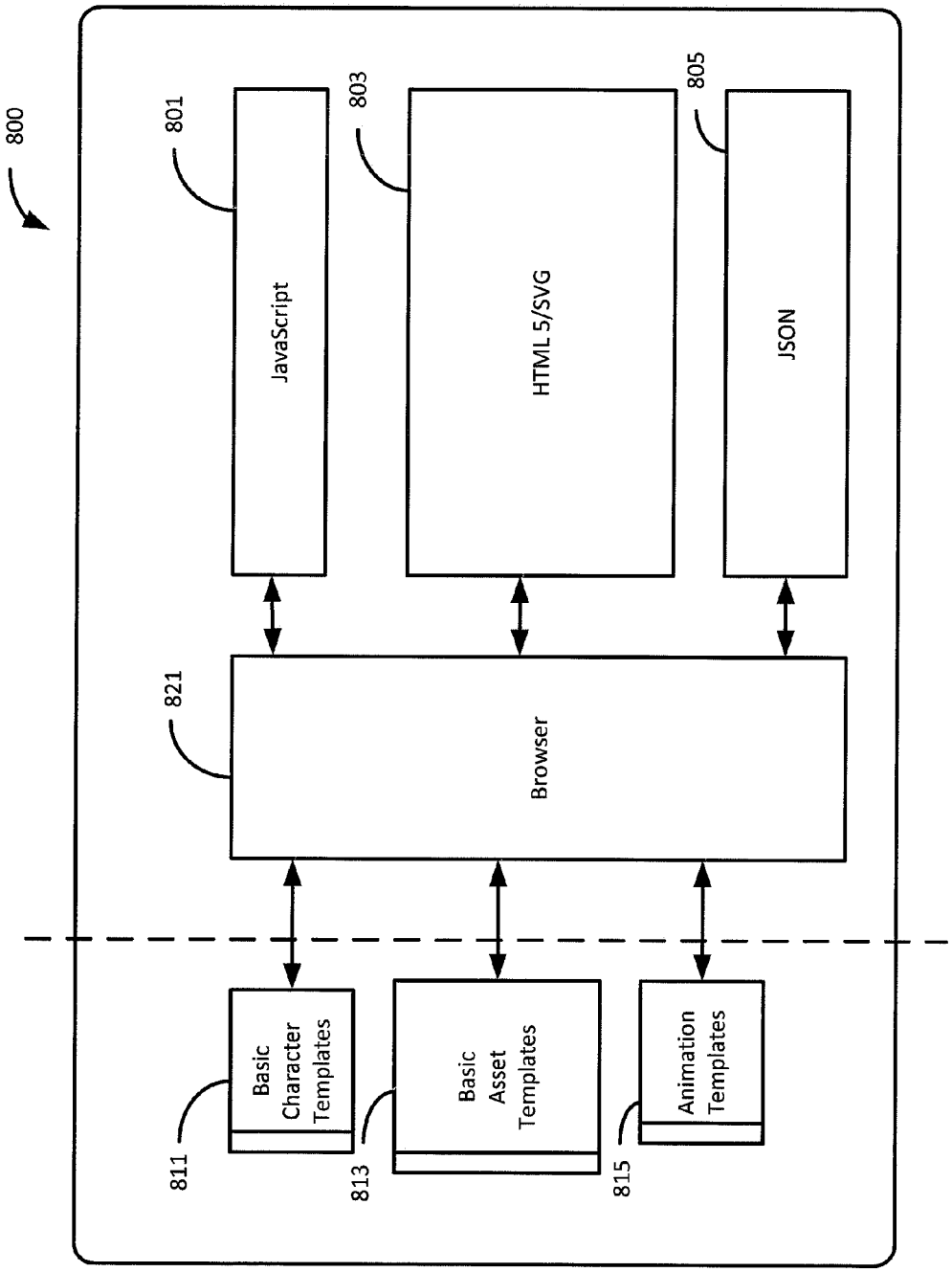
FIG. 7 is a block diagram of components in the case of a network configuration according to aspects of the invention.

FIG. 7 shows a block diagram for an alternative configuration in which a computing device 300 (for example any of 120-160) includes at least one Web browser that is capable of processing SVG and the programming language(s) of a Web application, such as JavaScript. An aspect of the invention is any Web browser that has been configured to handle HTML 5 and SVG, as well as JavaScript. FIG. 7 shows a configuration in which the Web Browser 821 processes HTML 5 803 and JavaScript 801 code of the Web application, which in turn may access SVG objects and JSON objects 805. Storage for initially downloaded basic character vector graphic objects 811, basic asset vector graphic objects 813 and animation data objects 815 may also be provided in a local memory device.

In a similar manner as in application program 721, the same JavaScript library may be included in the JavaScript 801 to be processed in the Web browser 821.

Example

Figure 8:
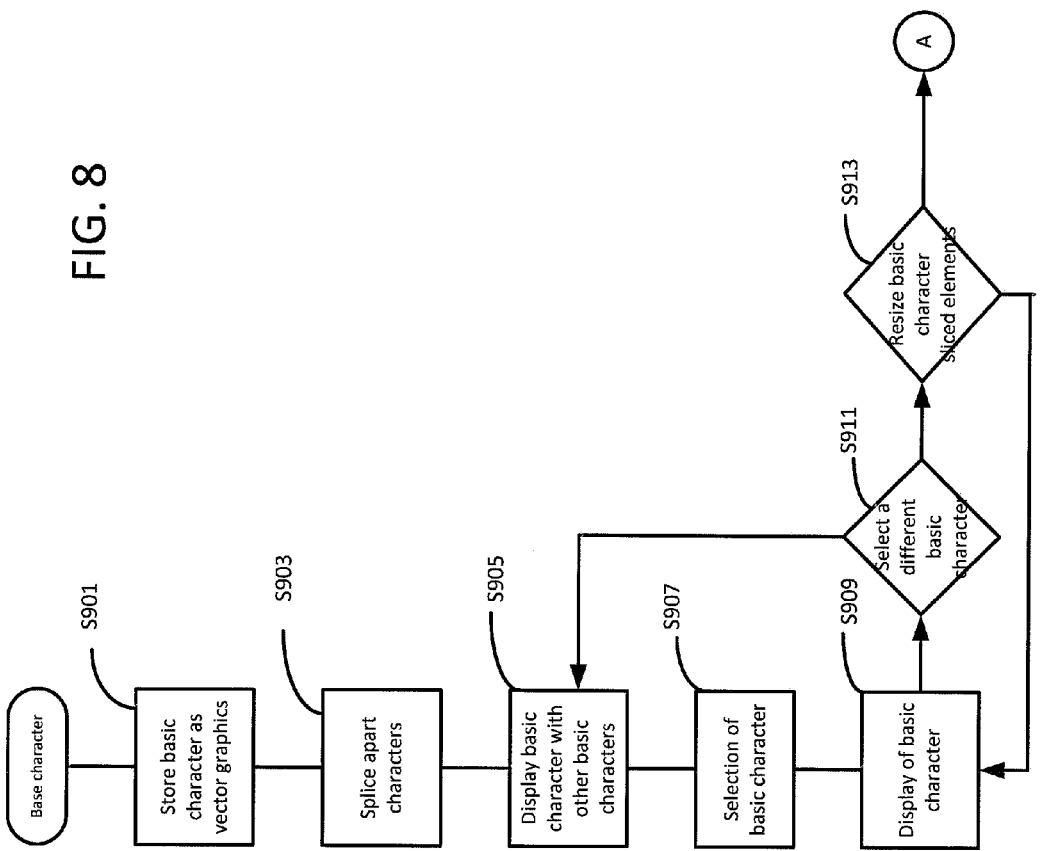
FIG. 8 is a flowchart for customizing a character according to aspects of the invention.
Figure 9:
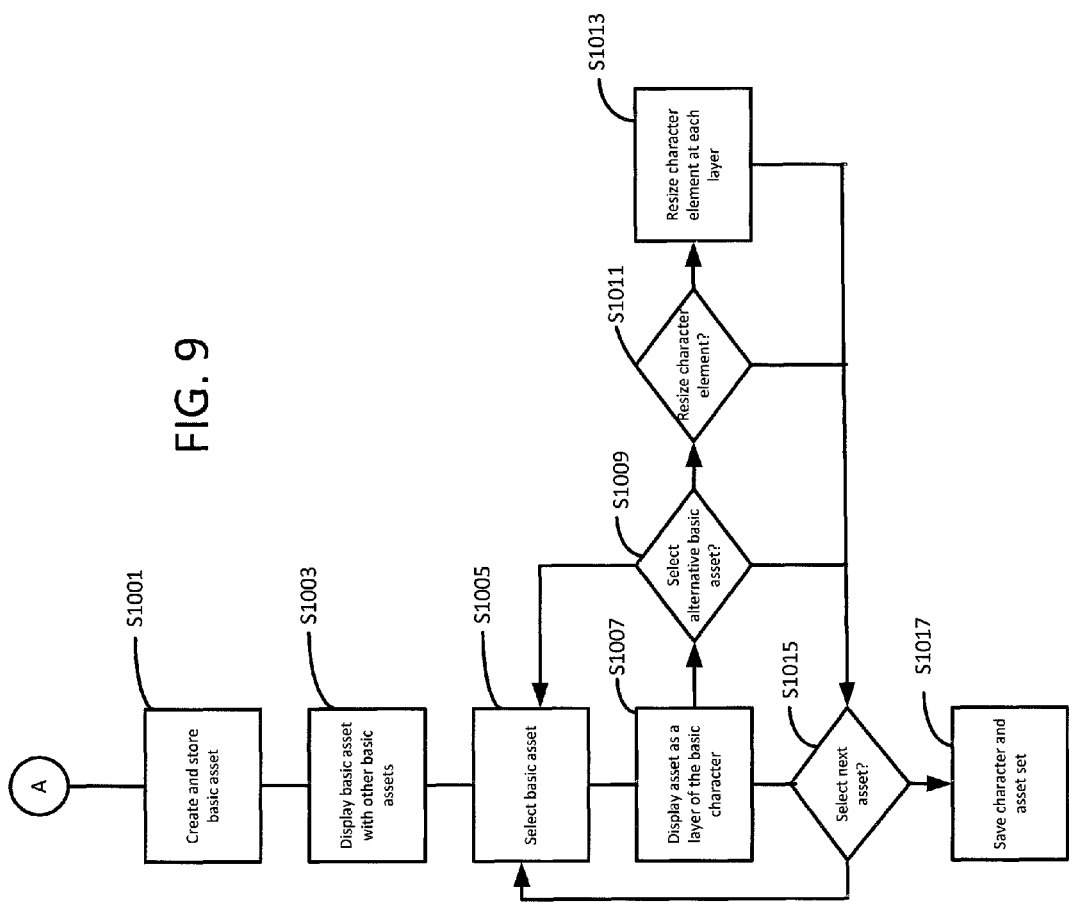
FIG. 9 is a flowchart for customizing a character with assets according to aspects of the invention.
Figure 10:
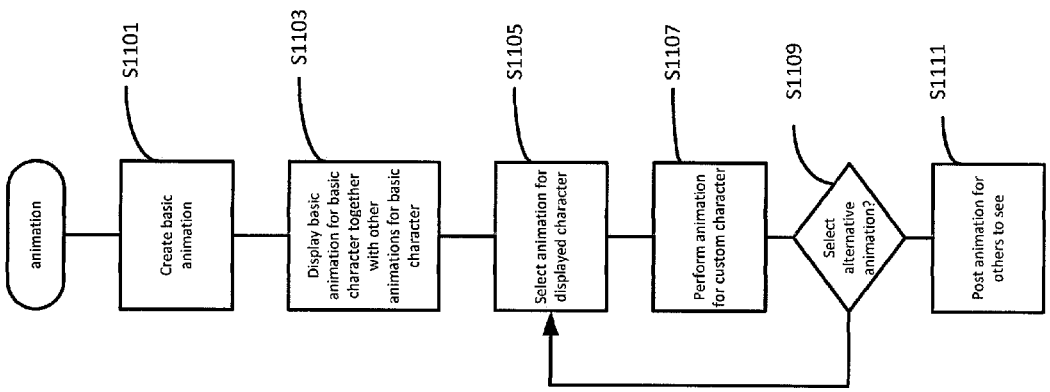
FIG. 10 is a flowchart for applying animation to a customized character according to aspects of the invention.

An aspect of the invention is that illustrators and artists can provide a large number of two dimensional characters without having to also create a large number of characters of various sizes, and various animations may be performed with the characters without having to create an animation for each size variation. FIGS. 8, 9, and 10 are flowcharts for the operation of the invention that enable creation of a large number of characters of arbitrary scale in combination with a large number of character asset permutations based on a much lower number of basic characters, and a capability of performing any of a variety of animations of the characters of arbitrary scale.

At step S901, basic two dimensional characters represented as vector graphics may be submitted by illustrators and artists and stored, in order to be used in creation of custom characters. In order for scaling and animation to be performed at a finer degree than at the level of a whole two dimensional character, at step S903 the two dimensional characters represented in vector graphics may be spliced into recognizable parts, such as limbs, head, body. In addition, animation data objects that are previously defined may serve as a basis for the extent that characters are spliced. In other words, the layers specified in animation data objects may serve as a basis for defining parts to be sliced out. The opposite is also true, where a degree of splicing of characters into parts can be used in designating layers for animation in animation data objects. An aspect of the invention is that character parts spliced from a two dimensional character match layers in animation data objects that may be used to animate a two dimensional character.

An aspect of the invention is an app that can be downloaded and used to create customized two-dimensional characters from the basic characters. Upon execution of the app, basic two dimensional vector graphic characters can be retrieved and in step S905, processed for display. At any time during character customization, the app allows for selection of a basic character. At step S907, a basic character can be selected from among the displayed basic characters. In an example embodiment, at step S909 a selected basic character may be displayed in a location of the screen that enables customization of the selected character. An aspect of the invention is that an alternative basic character may be selected at step S911 in a case that it is desired to customize a different basic character.

A first type of customization can include resizing (adjusting scale) all or some of the sliced character parts at step S913. An aspect of the invention is two dimensional characters represented in vector graphics as opposed to raster images. In an example embodiment, two-dimensional characters may be created as Scalable Vector Graphic (SVG) objects. SVG objects are hierarchical data representations of geometric shapes that make up an object to be displayed. Although SVG objects require processing to form a displayed image, SVG provides a data representation that allows for arbitrary scaling without unattractive visual artifacts, such as squashing, skewing and stretching. An aspect of the invention is real-time adjustment of scale of the selected two dimensional character, and in particular adjusting scale of displayed parts, represented as SVG objects. Visually, a displayed character part may be resized by dragging an edge of the character part. Dimensions of a resized part are maintained in a JSON object that is associated with the selected character. The JSON object may be in the format of a character object as shown in FIG. 4. At this point, a JSON object may be stored locally in volatile memory in order to accommodate real-time maintenance of dimension data. Step S913 of adjustment of basic character dimensions is optional, or may be performed for just some displayed parts of the selected basic character.

An aspect of customization is the creation and application of assets to the basic character. Assets may include an element that is not part of the core body, including mustache, beard, hair, articles of clothing or other accessories. In addition, an aspect of the invention is automatic asset color modification based on a theme. In an example embodiment, a theme may be a sport, such as NBA basketball, where colors may be automatically modified to reflect a team's colors. FIG. 9 is a flowchart for customization of a selected basic character with assets.

At step S1001, assets may be created and submitted and stored in an asset storage as vector graphics. As such, assets may be submitted as scalable graphic vector (SVG) objects that may be resized.

Figure 12:
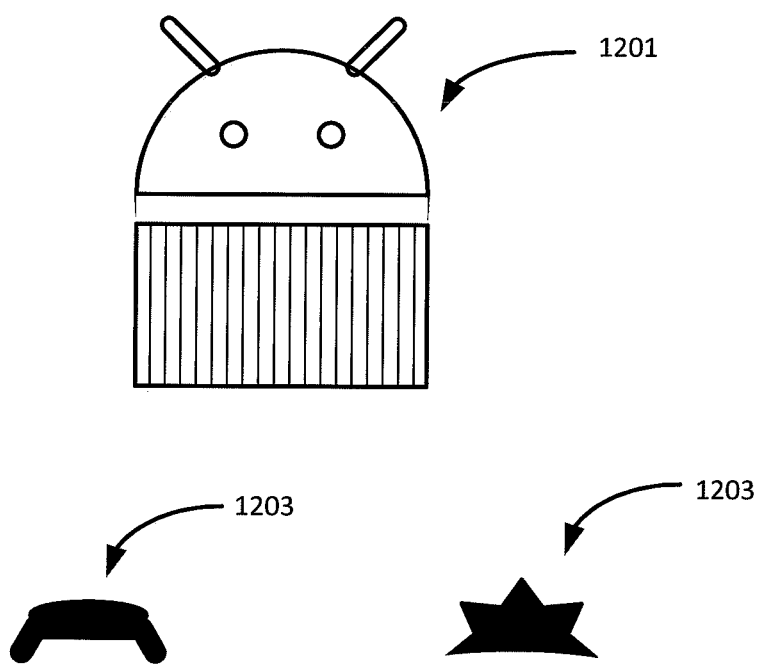
FIG. 12 is a screen showing an example set of hair assets according to aspects of the invention.

At step S1003, a set of assets may be displayed for selection while the previously selected basic character is being displayed. Alternatively, part of a displayed basic character may be selected, which causes a set of assets for the selected part to be displayed. FIG. 12 is an example screen showing a basic character 1201 and a set of hair assets 1203.

At step S1005, an asset may be selected from among the displayed group of basic assets.

An aspect of the invention is assets represented as one or more layers.

Asset layers may include:
Shirt
  body—the main part of the shirt; the shirt is scaled proportionally and cropped to the body; the basic shirt-body part is typically much bigger than the body part.
  top—drawn on top of the body; the top scales in width and height, useful for tattoos, chest hair, etc.
  arm—the arm part of the shirt; the arm part scales in width and height to the arm.
  bottom—just like top, only it is drawn before the skirt layer in pants.
Pants
  leg—the main part of the pants; the leg is scaled in width and height.
  top—drawn on top of the pants; the top scales proportionally with the width of the leg.
  skirt—scales the same way as top, but only drawn once as opposed to once per leg. Skirt layers are usually designed so that they hug the top of the "waist" of the character (the part of the body near the bottom before it starts to taper off).
Hair
  back—is drawn behind the head; A default color is replaced with the current hair color.
  front—is drawn on top of the head. (using a default color).
  backextra and frontextra—(e.g. ribbon) are the same as the back and front; The colors don't change with the hair color.
Accessories (each accessory is of one of these types)
  earring—moves/scales with the antenna.
  onlefthand and onrighthand—things like watches that are on the hand.
  inlefthand and inrighthand—items that are held in the hand.
  onbothhands—usually for gloves.
  sleeve—used for wristbands or other accessories that sit on the arm rather than in the hand.
  body—on the body, for example, a necklace.
  face—on the face, for example, freckles.
  mouth—in/on the mouth, for example, a pipe.
  hat—is on the head, but below glasses, for example, a headband or a skullcap.
  head—this is the same as hat, but it is above glasses; Used for bigger hats like a cowboy hat.
Other assets (glasses, shoes, etc.) don't have any special layers.

Figure 13:
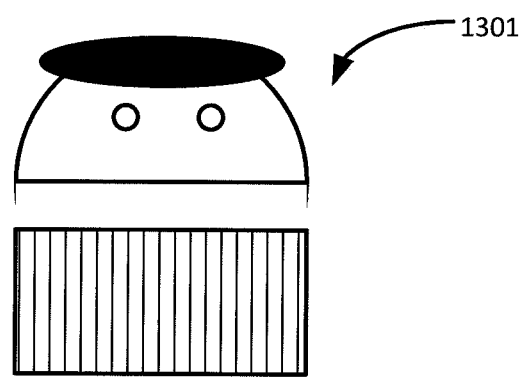
FIG. 13 is a screen showing a back layer for the example hair asset according to aspects of the invention.
Figure 14:
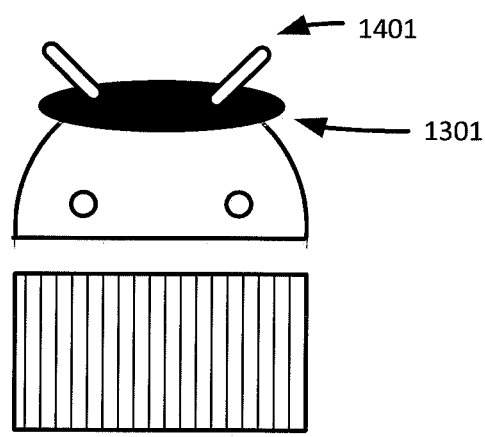
FIG. 14 is a screen showing the back layer formed as a lower layer than antennas according to aspects of the invention.

Using the hair asset as an example, FIG. 13 shows a back layer 1301 for the hair asset. As may be seen in FIG. 14, the back layer 1301 may be formed as a lower layer than antennas 1401. As may be seen in FIG. 15, a front layer 1501 for the hair asset may be formed as a topmost layer. In such case, the hair asset may be in the form of multiple layers 1301, 1501, possibly having layer relationships with character part objects, which are also layers.

Back to FIG. 9, at step S1007, a selected asset may be rendered as a layer of the displayed basic character and displayed at a position that depends on the type of asset. In a case that the part of the basic character that the asset is to be associated with has been adjusted in size, dimensions of the asset may be adjusted to conform to the dimensions of the associated character part.

At any point, at step S1009 an alternative to the selected asset may instead be selected as a replacement asset for an asset that is currently displayed on a character. Replacement of an asset may be performed by selection of an asset that is associated with a character part that already has a displayed asset. Replacement of an asset may be performed by an update function that includes clearing of the existing displayed asset, and combining a selected asset with a character part. In an example embodiment, an asset may be combined with a character part by creating a sprite. Interactive replacement of assets for an associated part of a character enables ultimate flexibility in the mixing of combinations of assets.

A character part having an associated asset may be resized (adjusted in scale) at step S1011. In the case of a part displayed as an asset layer of the displayed character, at step S1013 an aspect of the invention may be to resize each layer including the part itself and the associated asset. As an alternative, an aspect of the invention may be to resize only the layer that displays the asset. An aspect of the invention may be to combine two or more character parts and/or combine character parts with assets by grouping associated objects. As displayed character parts and assets are resized, the proportion of change relative to a default object may be maintained in a JSON object, such as that shown in FIG. 4.

At step S1015, assets can continue to be selected from among various assets in the set of displayed assets.

Figure 15:
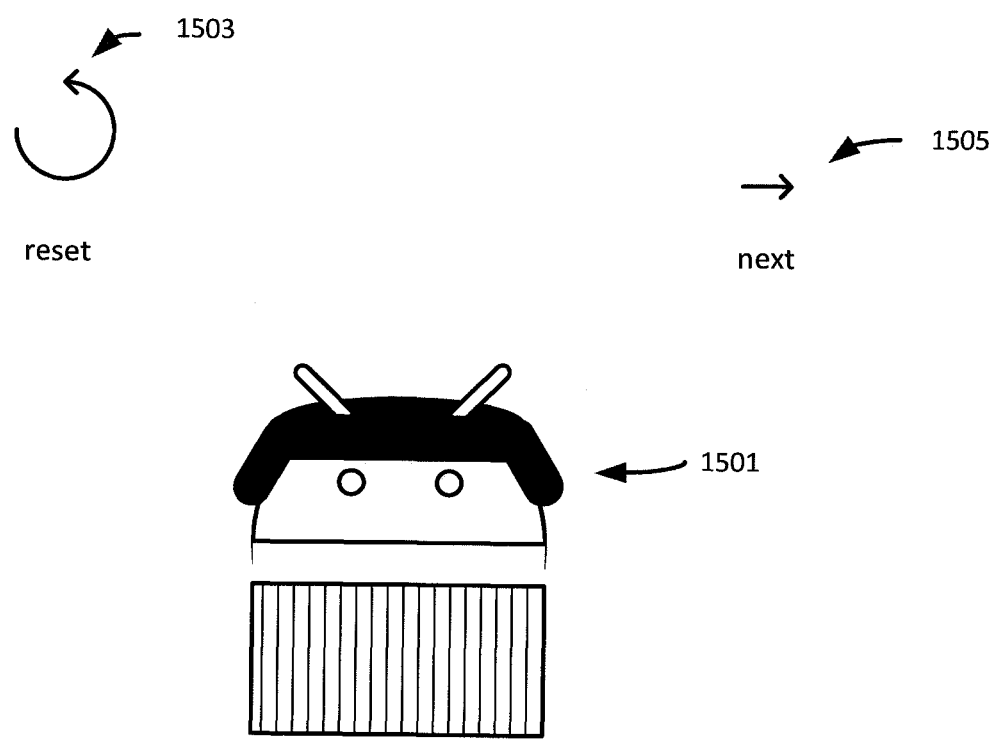
FIG. 15 is a screen showing a front layer for the example hair asset formed as a topmost layer according to aspects of the invention.

At any point during selection of assets for display as layers in a customized character, operation of customization of a character may be restarted, by for example selecting reset icon 1503, as shown in FIG. 15. In such case, basic characters can be redisplayed for selection, step S905. Steps involved in customizing a character may be finalized by choosing to save a customized character at step S1017, by for example selecting next icon, as shown in FIG. 15. An aspect of the invention is saving a customized character by moving the character object in the form of a JSON object, such as that shown in FIG. 4, to a nonvolatile memory.

Provided that displaying of two dimensional characters is performed from vector graphics, animations may be made by way of changing attributes of geometric elements of the vector graphics. Essentially, each part of the character is able to be scaled, as well as rotated and translated. By changing scale, rotation, and/or translation on a timeline, the character may be animated.

In an example embodiment, character animation may be based on coordinates for all the relevant body parts. Each coordinate is a property that can be animated. The animations are specified in individual key frames per property that specify the change of a body part over time.

For example, properties of an arm may be arm length, arm rotation, arm anchor point. An arm may be anchored around the shoulder and rotated by a certain degree. In the first frame it may be rotated by 0°, in the second frame it may be rotated by 5+ and so on.

The animations may be created with a sample character having average sizes for the individual limbs. The limb coordinates may be applied to the character, independently of the character's customized body proportions. However, an aspect of the invention is a parametric system that uses relative values for all coordinates, and can be adjusted depending on customized characters.

Subsequently, an aspect of the invention is a technique that includes specifying rotation animations as a sequence of joint rotations or relative positions from joint sockets, and storing the animation sequence data in a hierarchical data structure, such as the JSON object of FIG. 5. Alternatively, data structures in other markup languages may be used to store animation data, such as XML. Other animation properties may include position and scale.

The technique enables animation of characters without having to create beforehand graphic images for each frame of an animation. As such, the technique greatly simplifies creation of animations by minimizing the amount of data needed to specify an animation, while only requiring creation of a basic two dimensional character. The technique enables a substantially reduced amount of memory for storage and reduced bandwidth for transmission of animations. The technique enables creation of a large number of animations for any two-dimensional character. The technique enables a specification for an animation that is applicable to many customized characters irrespective of scale.

FIG. 10 is a flowchart for steps that may be taken to create animations and apply the animations to custom scaled characters. A developer may choose layers and properties that are identified for a basic character for use in creating an animation. In the example case of the format shown in FIG. 5, a developer can create an animation specification that includes data objects for each layer and property combination that are to be included. Each data object for a layer and property may include an initial value of the property, a start frame that the initial frame will be effective, a duration of the animation sequence, and values for the frames of the animation sequence. In an example embodiment, the list of layer-property combinations for an animation are stored in a JSON object. Step S1101 is a step of creating and storing of an animation specification.

At step S1103, after a user has created and saved a customized character, the user can choose to apply an animation. In an example embodiment, a set of basic animations may be displayed. Each animation may be displayed in a form of a reduced size basic two dimensional character, with the respective animation specification being performed in a continuous manner. In other words, the display may show several reduced characters cycling through their respective animation sequence. Each reduced character may have an associated character object, such as that shown in FIG. 4, including dimension parameters having values that indicate a fraction of an associated default value for a basic character. The animation specifications being in the form of an animation object, such as that shown in FIG. 5. The animation objects may be independent of the scale of the character object.

The number of animated characters being displayed is based on the size of a display device. For small screen sizes, such as in smartphones, each animated character may be displayed based on a substantially small scale suitable for the dimensions of the display. The display of basic animated characters may be in a row along a bottom border of the screen. Alternatively, the display of the basic animated characters may be along edges of a display screen, including a column along the right or left edge of the screen, or a top row of the screen.

Figure 17:
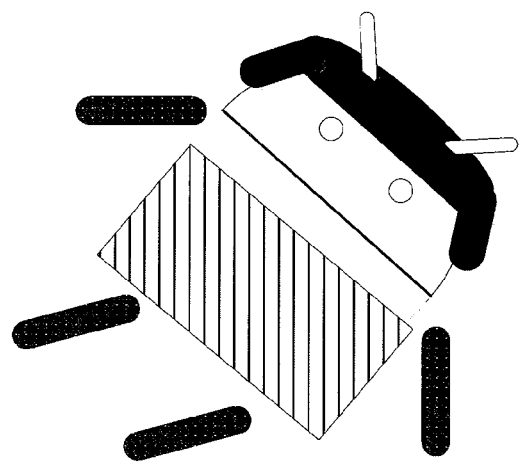
FIG. 17 is a screen that depicts a state of an animated character as it is performing an animation in accordance with an animation specification according to aspects of the invention.
Figure 18:
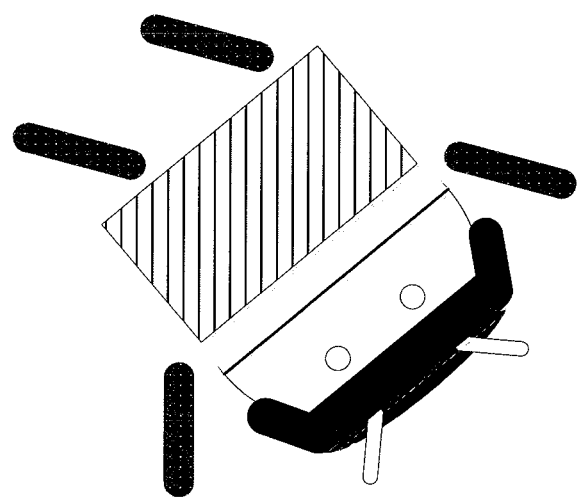
FIG. 18 is a screen that depicts a state of an animated character as it is performing an animation in accordance with an animation specification according to aspects of the invention.

FIG. 16 shows an example of a customized character displayed together with a set of available animation types 1601. At step S1105 of FIG. 10, while the two dimensional customized character is being displayed, one of the basic animations may be selected from among the set of basic animation types 1601 may be displayed for a basic character. Upon selection of a basic animation type, at step S1107 the animation specification associated with the selected basic animation is applied to the two dimensional customized character. FIGS. 17 and 18 depict states of an animated character as it is performing an animation in accordance with the animation specification. As can be seen in these figures, all layers of a customized character, including assets, may be subject to animation data for particular layer-property combinations as provided in the animation specification. FIG. 19 shows example animation specification data for an animation object.

At step S1109 (YES), an alternative basic animation may be selected, in which case, the alternative basic animation may be applied in place of the previously selected animation. Steps S1105 to S1109 may be repeated as the user desires.

At some point, at step S1111 the final animation of the customized character may be sent to a permanent storage location. In an example embodiment, the final animation may consist of a basic character, basic assets, a JSON object for the customized character, and a JSON object for the selected animation. These items may be moved to another storage location for future display. For example, the animated customized character may be posted to a web site for display. Alternatively, the basic character, basic asset(s) and associated JSON objects may be incorporated into an application.

An aspect of the invention includes mixing and matching basic characters of arbitrary scale with combinations of assets, and trying any of several animations on the customized character, as a game. An aspect of the invention is creation of customized characters and various animations for incorporation into applications, such as video games. An aspect of the invention is the creation of a personal animated character.

Figure 11:
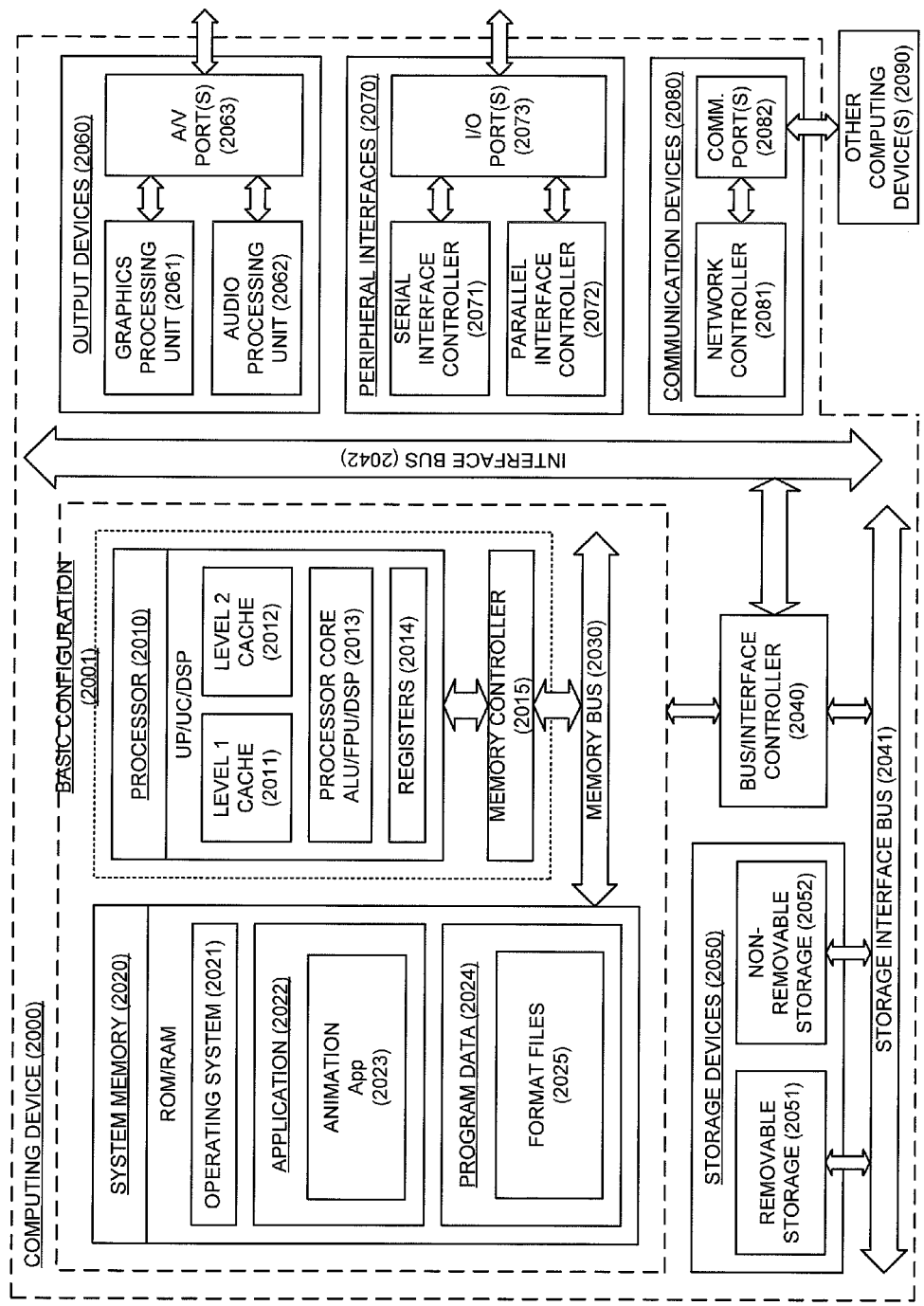
FIG. 11 is a block diagram illustrating an example general purpose computing device.

FIG. 11 is a block diagram illustrating an example computing device 2000 that is arranged for creating custom scalable animated characters on the web. In a very basic configuration 2001, computing device 2000 typically includes one or more processors 2010 and system memory 2020. A memory bus 2030 can be used for communicating between the processor 2010 and the system memory 2020.

Depending on the desired configuration, processor 2010 can be of any type including but not limited to a microprocessor (μP), a microcontroller (μC), a digital signal processor (DSP), or any combination thereof. Processor 2010 can include one more levels of caching, such as a level one cache 2011 and a level two cache 2012, a processor core 2013, and registers 2014. The processor core 2013 can include an arithmetic logic unit (ALU), a floating point unit (FPU), a digital signal processing core (DSP Core), or any combination thereof. A memory controller 2015 can also be used with the processor 2010, or in some implementations the memory controller 2015 can be an internal part of the processor 2010.

Depending on the desired configuration, the system memory 2020 can be of any type including but not limited to volatile memory (such as RAM), non-volatile memory (such as ROM, flash memory, etc.) or any combination thereof. System memory 2020 typically includes an operating system 2021, one or more applications 2022, and program data 2024. Application 2022 includes an animation app 2023. Program Data 2024 includes structured data objects 2025, as described above. In some embodiments, application 2022 can be arranged to operate with program data 2024 on an operating system 2021. This described basic configuration is illustrated in FIG. 20 by those components within dashed line 2001.

Computing device 2000 can have additional features or functionality, and additional interfaces to facilitate communications between the basic configuration 2001 and any required devices and interfaces. For example, a bus/interface controller 2040 can be used to facilitate communications between the basic configuration 2001 and one or more data storage devices 2050 via a storage interface bus 2041. The data storage devices 2050 can be removable storage devices 2051, non-removable storage devices 2052, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 2020, removable storage 2051 and non-removable storage 2052 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 2000. Any such computer storage media can be part of device 2000.

Computing device 2000 can also include an interface bus 2042 for facilitating communication from various interface devices (e.g., output interfaces, peripheral interfaces, and communication interfaces) to the basic configuration 2001 via the bus/interface controller 2040. Example output devices 2060 include a graphics processing unit 2061 and an audio processing unit 2062, which can be configured to communicate to various external devices such as a display or speakers via one or more A/V ports 2063. Example peripheral interfaces 2070 include a serial interface controller 2071 or a parallel interface controller 2072, which can be configured to communicate with external devices such as input devices (e.g., keyboard, mouse, pen, voice input device, touch input device, etc.) or other peripheral devices (e.g., printer, scanner, etc.) via one or more I/O ports 2073. An example communication device 2080 includes a network controller 2081, which can be arranged to facilitate communications with one or more other computing devices 2090 over a network communication via one or more communication ports 2082. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 2000 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 2000 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency trade-offs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A system comprising:
one or more data processing devices;
said one or more data processing devices including a local memory configured to store a character hierarchical data structure for maintaining parameter values associated with geometric shapes for a vector graphic character, the vector graphic character having a plurality of character part objects represented as the geometric shapes;
said one or more data processing devices configured to perform a character scaling section that, upon receiving a command to change a scale of one or more said character part objects of the two dimensional character displayed in an interaction display area of a display device, executes vector graphic scaling functions to arbitrarily change scale of the character part object based on said parameters, stores updated proportions as values of said parameters relative to default dimensions of the character part objects in the character hierarchical data structure, and displays in the interaction display area of the display device a scaled two dimensional character in accordance with the updated proportions;
said one or more data processing devices configured to retrieve one or more animation templates from an animation memory, and apply the animation templates to a basic graphic character having default dimensions in order to display one or more different types of animations of the basic graphic character;
said one or more data processing devices configured to perform an animation section that upon selection of one of said animation templates, applies the selected animation template to the scaled vector graphic character; and
display in the display device an animation of the scaled two dimensional character based on the selected animation template.

2. The system of claim 1, wherein said one or more data processing devices are configured to perform a character scaling section that, upon receiving a further command to change a scale of a two dimensional character displayed in an interaction display area of a display device, executes vector graphic scaling functions to further arbitrarily change scale of one or more said character part objects of the vector graphic character, stores further updated proportions relative to default dimensions of the character part objects in the character hierarchical data structure, and displays in the interaction display area of the display device a revised scaled two dimensional character in accordance with the further updated proportions.

3. The system of claim 1, further comprising:
a graphical user interface including:
the display displaying one or more assets retrieved from an asset memory storing vector graphics of assets,
said one or more data processing devices configured to perform an asset displaying section that upon selection of a graphic asset, renders the selected graphic asset superimposed as a layer over a corresponding character part object as a layer of the vector graphic character to display the two dimensional character and superimposed asset in the interaction display area, and
said one or more data processing devices configured to perform an asset scaling section that upon receiving a command to scale one or more said character part objects of the graphic character displayed in the interaction display area, changes the scale of the graphic asset in accordance with the scale of a respective character part object.

4. The system of claim 3, wherein the one or more vector graphic assets include clothing, accessories, or additional body features.

5. The system of claim 3, further comprising a graphic character memory, wherein said graphical user interface further includes a save function, which upon execution of the save function stores the contents of the character hierarchical data structure into a nonvolatile memory.

6. The system of claim 1, wherein said one or more data processing devices configured to perform a reception section for submission of vector graphic characters and graphic assets for storage to a graphic character storage or a graphic asset storage, respectively.

7. The system of claim 1, further comprising an Internet browser application, wherein said Internet browser application functions are performed by executing scripting language commands, and the vector graphic characters, the character hierarchical data structure, and the animation templates are hierarchical data objects that are downloaded from an Internet server.

8. The system of claim 1, further comprising an animation application processor, which executes scripting language commands of an animation application, and the vector graphic characters, the character hierarchical data structure, and the animation templates are hierarchical data objects that are downloaded from a server.

9. The system of claim 1, wherein said one or more data processing devices configured to perform said animation section, which upon selection of another one of said animation templates, applies the another selected animation template to the scaled vector graphic character in place of the previously selected animation template; and display in the display device an animation of the scaled two dimensional character based on the another selected animation template.

10. A method in a computer system, the computer system including a graphic character object temporary storage that stores parameters of the character and associated default values in a hierarchical data structure and one or more animation object data represented in a hierarchical data structure, the one or more animation object data having an associated display character animation, the graphic character object temporary storage and the animation object data being part of a local memory of the computer system, the method comprising:

receiving a two dimensional character vector graphic object, the vector graphic object having character part objects which are represented as geometric shapes;

rendering the two dimensional character vector object as a displayable image and displaying the image as a two dimensional character;

accepting an input to change the scale of a part of the displayed two dimensional character, and converting the displayed scaled part into adjusted parameter values of the corresponding geometric shape;

storing the adjusted parameter in the graphic character object temporary storage as a percentage change from the default value;

displaying the two dimensional character with the scaled part as a customized two dimensional character;

displaying the one or more display character animations;

for one said display character animation, applying keyframe data in the associated animation object data to the character parts objects;

displaying the customized two dimensional character as an animation according to the keyframe data.

11. The method of claim 10, further comprising one or more two dimensional asset vector graphic objects for associated character parts objects, the method further comprising rendering the one or more two dimensional vector graphic objects as one or more images of the assets, and displaying the asset image as a layer for a respective character part, accepting a drag operation to change scale of the one or more asset images, and converting the displayed scaled asset into adjusted parameter values of the corresponding geometric shape to display as a customized two dimensional character; and storing the adjusted parameter in the graphic character object temporary storage as a percentage change from the default value.

12. The method of claim 10, wherein character parts objects include a joint and the keyframe data includes a sequence of joint rotation angles.

13. The method of claim 11, further comprising interacting with the customized two dimensional character having the displayed asset image and replacing the asset image with a new asset image for a respective character part, and displaying the customized two dimensional character with the replaced asset.

* * * * *